United States Patent [19]

Schmidt

[11] 3,783,521
[45] Jan. 8, 1974

[54] VEHICLE TORSION BAR SETTING GAUGE

[75] Inventor: Raymond H. Schmidt, Buffalo, Minn.

[73] Assignee: Royal Industries, Inc., Osseo, Minn.

[22] Filed: Feb. 18, 1972

[21] Appl. No.: 227,353

[52] U.S. Cl. ........ 33/181 AT, 33/203.17, 33/203.21
[51] Int. Cl. ............................................. G01b 5/24
[58] Field of Search ................ 33/180 AT, 181 AT, 33/169 R, 203.21, 203.15, 203.17

[56] References Cited
UNITED STATES PATENTS

| | | | |
|---|---|---|---|
| 3,111,773 | 11/1963 | Hunter | 33/181 AT |
| 3,108,382 | 10/1963 | Vorpahl | 33/181 AT |
| 3,266,163 | 8/1966 | Wilkerson | 33/181 AT |
| 3,203,103 | 8/1965 | McElfresh et al. | 33/181 AT |

Primary Examiner—William D. Martin, Jr.
Assistant Examiner—Milton S. Gerstein
Attorney—Carlsen, Carlsen & Sturm

[57] ABSTRACT

This is a gauge for facilitating the setting of the two torsion bars on an automobile and embodies a single base unit adapted to be stably supported on the same surface as the wheels of the car, the base unit supporting two pairs of upstanding gauge strut assemblies, each pair of which includes extensible portions with feeler elements for respective engagement with two vehicle reference surfaces and also includes an elongated pointer arm coupled to the pair of extensible portions to indicate the relative elevation differential between said vehicle reference surfaces.

6 Claims, 4 Drawing Figures

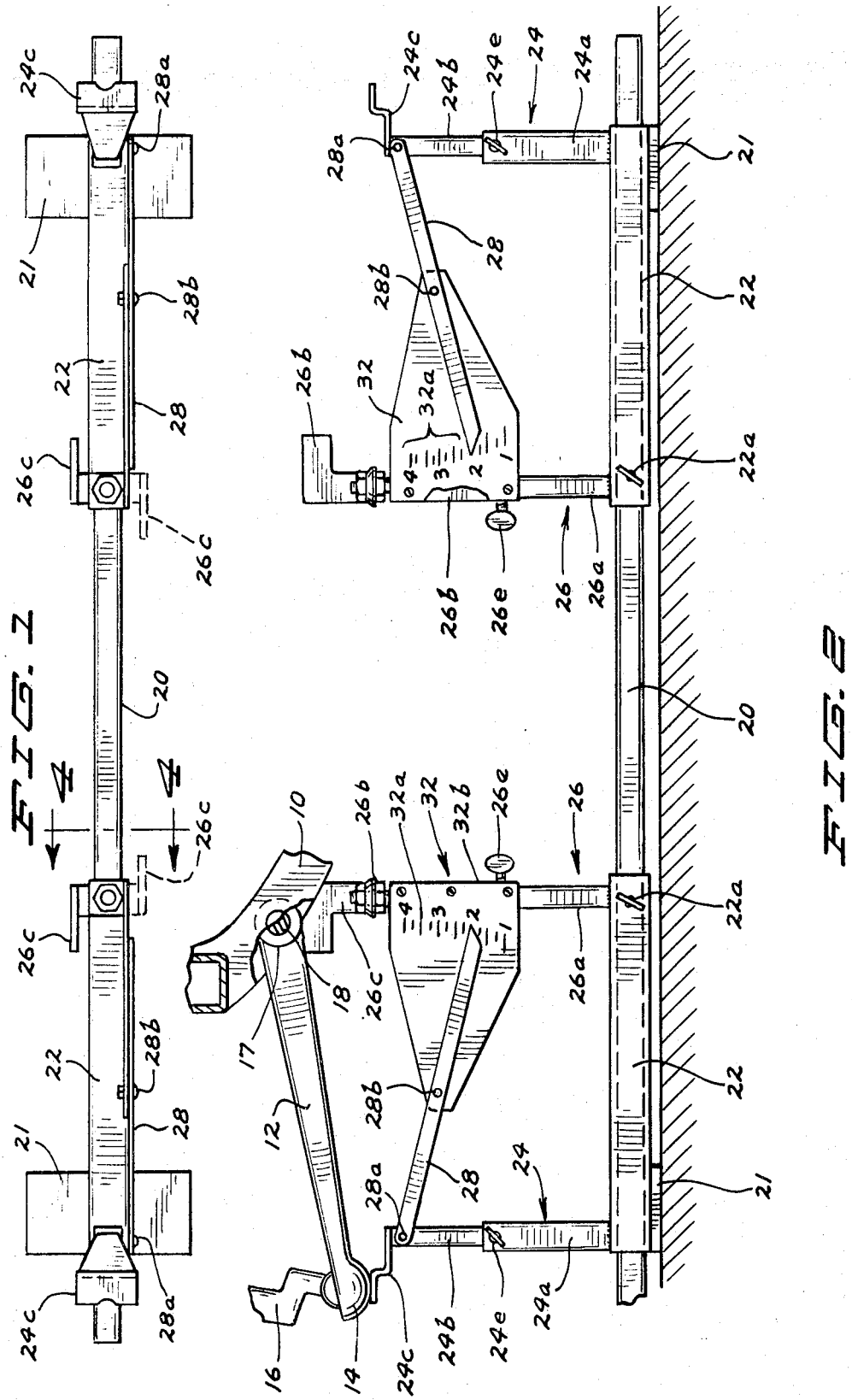

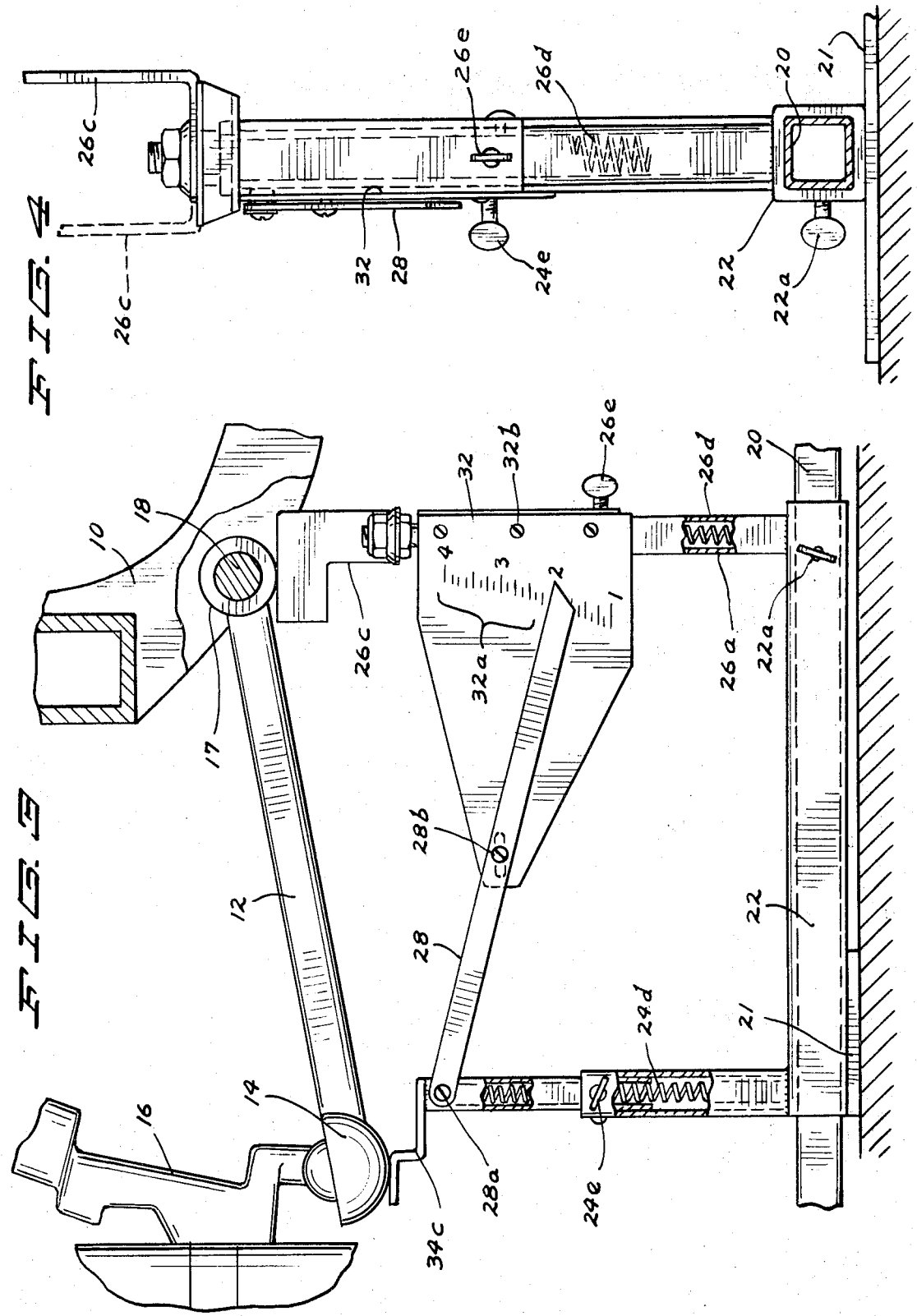

VEHICLE TORSION BAR SETTING GAUGE

BACKGROUND OF THE INVENTION

This invention relates generally to vehicle torsion bar setting gauges and specifically to a quickly positioned and easily read gauge unit which is adapted for use with a number of different makes of automotive vehicles.

In the past most of the torsion bar gauge units have required suspension from the vehicle itself and this is difficult and time consuming particularly in view of the different undercarriages for the various makes of automobiles. Such a system is disclosed in United States Pat. No. 3,108,382 issued to Vorpahl Oct. 29, 1963. Attempts have also been made to provide a floor supported unit such as is shown in United States Letters Pat. No. 3,111,773 issued to Hunter Nov. 23, 1963. However, this structure requires the lifting of the entire unit into position prior to releasing the extendable supporting strut members.

It is an object of the present invention to provide a vehicle torsion bar setting gauge unit which is stably supported on a floor surface not only when disposed in operative position but also during the pre-operative positioning thereof, thus eliminating the necessity of lifting and holding the unit while positioning the same beneath the vehicle.

More specifically, it is an object to provide a torsion bar setting gauge which includes an elongated floor supported cross bar unit provided with stabilizing means and having two pairs of gauge strut units respectively mounted on the ends of the cross bar unit, each pair including a ball point feeler element and a torsion bar feeler element with a pointer arm coupled respectively with the feeler elements and including a calibrated scale which indicates directly the difference in elevation between the bottom surface of the torsion bar sleeve and the bottom surface of the ball joint.

Still more specifically it is an object to provide a gauge of the type described which may be quickly and easily positioned and adjusted to accommodate differences in the lateral spacing between the torsion bar to the ball joint of the various automobile makes.

These and other objects and advantages of this invention will be apparent from the following description made in connection with the accompanying drawing wherein like reference characters refer to similar parts throughout the several views, and in which:

FIG. 1 is a top plan view of my torsion bar setting gauge,

FIG. 2 is an elevational view showing my gauge unit with one side thereof mounted in operative position beneath the suspension system of a vehicle;

FIG. 3 is an elevational view similar to FIG. 2 but on a somewhat enlarged scale and having portions thereof broken away; and FIG. 4 is a traverse vertical sectional view taken substantially along the line 4—4 of FIG. 1 but drawn to a somewhat enlarged scale.

Many present day automobiles are using torsion bar suspension systems. A portion of such a system is diagrammatically illustrated in the accompanying drawings and embodies a vehicle frame designated by the numeral 10, a lower suspension arm 12 to which is connected the lower ball joint 14 which in turn supports the spindle assembly 16. The difference in elevation between the torsion bar sleeve 17 at the inner end of the arm 12 and the outer end of said arm must be the same for both sides of the car and this elevation differential is adjustable by varying the tension (through suitable means, not shown) in the torsion bar 18 which provides the spring suspension for the vehicle chassis frame 10.

My gauge unit includes an elongated cross bar 20 on which are mounted a pair of sleeves 22, all of which combine to form a supporting base unit. These sleeves are slidably adjustable on bar 20 with suitable means for locking the same in the desired position such as the thumb screws 22a. A pair of stablizing plates or pads 21 are respectively mounted on the sleeves 22 and provide lateral stability for the base unit. A pair of gauge strut assemblies 24 and 26 are mounted on each of the sleeves 22.

Strut assembly 24 includes an upstanding hollow lower member 24a with an extensible upper member 24b telescopically mounted therein. A feeler element 24c is mounted on the top of the extensible strut element 24b and is adapted to engage the lower surface of the ball joint 14 which provides a first reference surface for the gauge reading.

Gauge strut assembly 26 includes a lower upstanding member 26a with a hollow extensible upper member 26b telescopically received therearound. A feeler element 26c is rotatably mounted on the top of the extensible strut member 26b and engages the torsion bar sleeve 17 on which the lower suspension arm 12 is mounted which provides the second reference surface for the gauge reading.

An elongated pointer arm designated by the numeral 28 is coupled with the two extensible strut portions 24b and 26b as by being pin connected at 28a to the extensible member 24b and pin connected at 28b to an indicator plate 32 having a scale 32a. Plate 32 is mounted on the extensible strut member 26b as by the screws 32b.

In the operation of the torsion bar gauge unit disclosed herein, the cross bar 10 is initially placed on the floor or other surface on which the front wheels of the vehicle are supported and the position of each pair of feeler elements 24c and 26c is adjusted to respectively engage the bottom surface of ball joint 14 and the torsion bar sleeve 17 as illustrated in FIGS. 2 and 3. In the form shown, feeler 26c is adjustably connected for rotation on the top of the extensible member 26b as indicated by the dotted line position shown in FIGS. 1 and 4 to permit adjustment of the lateral spacing between said feeler elements 24c and 26c as may be required for different makes of automobiles. In the form shown, both of the extensible members 24b and 26b are spring biased upwardly as by springs 24d and 26d respectively and thumb set screws 24e and 26e are respectively provided for holding said extendible members in downwardly compressed position until proper alignment has been obtained between the feeler elements 24c and 26c and their respective reference surfaces. Upon release of the set screws 24e and 26e the springs 24d and 26d will extend the upper members 24b and 26b upwardly and engage the feeler elements 24c with the under surface of ball joint 14 and feeler element 26c with the torsion bar sleeve 17. Sleeves 22 permit each pair of gauge strut assemblies to be adjustably positioned longitudinally along the support bar 20 and when this has been accomplished the set screws 22a are secured in place to maintain the desired adjusted position.

When both feeler elements 24c are respectively engaged with the undersurfaces of the ball joints 14 on both sides of the automobile and the feeler gauges 26c are respectively engaged with both of the torsion bar sleeves 17, each pointer 28 will indicate on the graduated scale 32a of indicator plate 32 the respective readings of the elvation differentials between the ball joints 14 and their respective torsion bar sleeves 17. The torsion bars 18 can then be easily adjusted until these readings are within the accepted ranges.

It will be seen that this invention provides a vehicle torsion bar setting gauge unit which is particularly adapted to be quickly and easily placed in stabilized operative position beneath the undercarriage of the vehicle and which does not require lifting or holding of the unit during this positioning operation. The combination of the floor supported base structure and the two pairs of upwardly extending strut assemblies with the respective pointer arms and indicator scales provides a gauge unit which will readily indicate the elevation differential between the ball joints and the respective torsion bar sleeves which are the two reference surfaces conventionally used for this purpose.

It will, of course, be understood that various changes may be made in the form, details, arrangement and proportion of the parts without departing from the scope of the invention, which generally stated, consists in the matter set forth in the accompanying claims.

Having now therefore fully illustrated and described my invention, what I claim to be new and desire to protect by Letters Patent is:

1. A vehicle torsion bar setting gauge comprising;
   a single elongated floor engaging base unit; two pairs of upstanding gauge strut assemblies mounted on said base, each of said pairs embodying;
   a first extensible member having a feeler element for engaging a first reference surface,
   a second upwardly extensible member having a feeler element for engaging a second reference surface,
   one of said feeler element being adjustable to vary the spacing intermediate the feeler element on said first and second upwardly extensible members, and means for indicating the difference in elevation between the two engaged reference surfaces, said means including lever means pivotally disposed on one of said extensible members and an indicia scale mounted on the other of said extensible members and pivotally connected to said lever means, said indicia scale being disposed intermediate said first and second upwardly extensible members.

2. The structure set forth in claim 1 and said base unit including a cross bar with a pair of sleeve members slidably mounted thereon,
   the two pairs of strut assemblies respectively mounted on said sleeve members to permit adjustment of the position of each pair of strut assemblies as a unit, and
   releasable means for locking said sleeves to said cross bar in the desired adjusted position.

3. The structure set forth in claim 1 and spring means for urging said extensible members upwardly into engagement with the respective reference surfaces of the vehicle, and
   releasable means for holding said extensible members in compressed position.

4. The structure set forth in claim 1 and a plurality of stabilizing plate members underlying said base unit and extending laterally on both sides thereof to provide the necessary lateral stability therefor.

5. The structure set forth in claim 1 and means for adjusting the space between each pair strut assemblies.

6. The structure set forth in claim 1 wherein said adjustable feeler element extends in parallel relation to the axis of said elongated base unit offset to one side of the upstanding axis of its strut assembly, said feeler element being rotatable on the extensible member of the strut assembly to permit the offset extending portion to be reversed to the opposite side of the strut assembly and thereby vary the spacing between the two feeler elements.

* * * * *